May 12, 1970 J. R. COX 3,511,394
DRAINAGE DITCH MACHINE

Filed Sept. 29, 1967 4 Sheets-Sheet 3

INVENTOR
JACK R. COX

BY
B. P. Fishburn Jr.
ATTORNEY

May 12, 1970   J. R. COX   3,511,394
DRAINAGE DITCH MACHINE
Filed Sept. 29, 1967   4 Sheets-Sheet 4
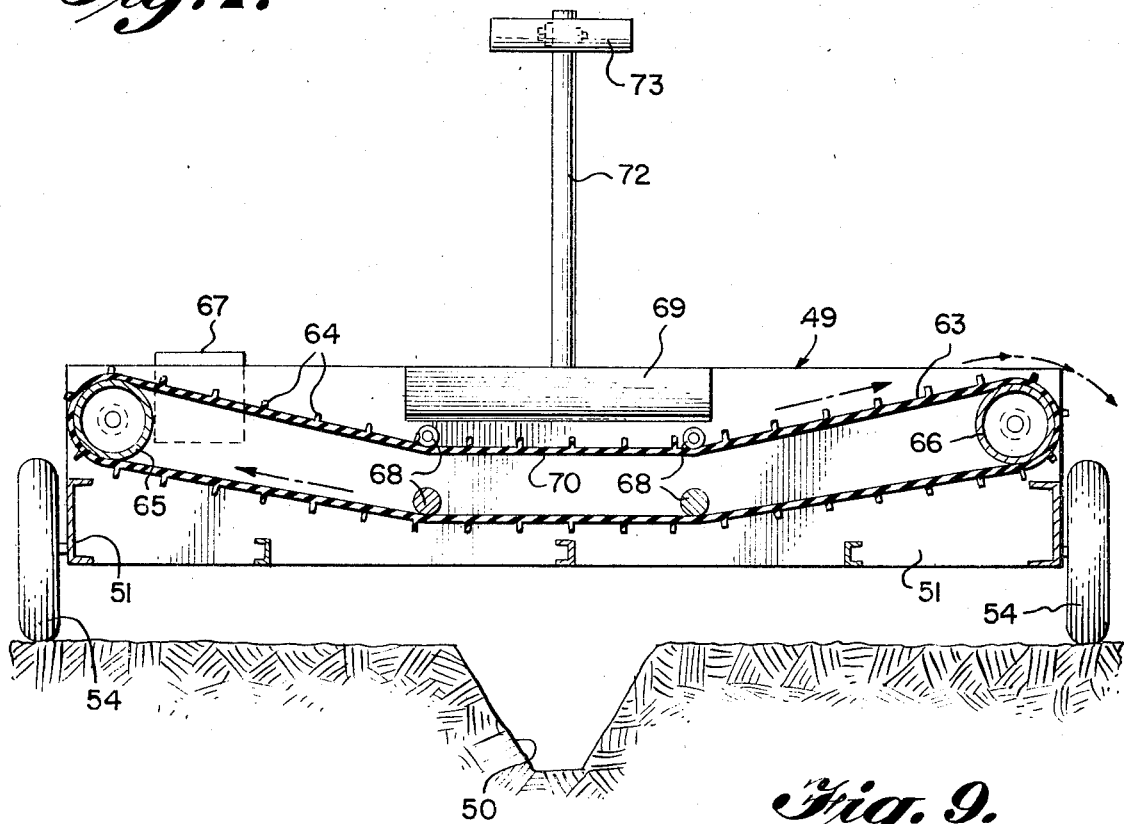
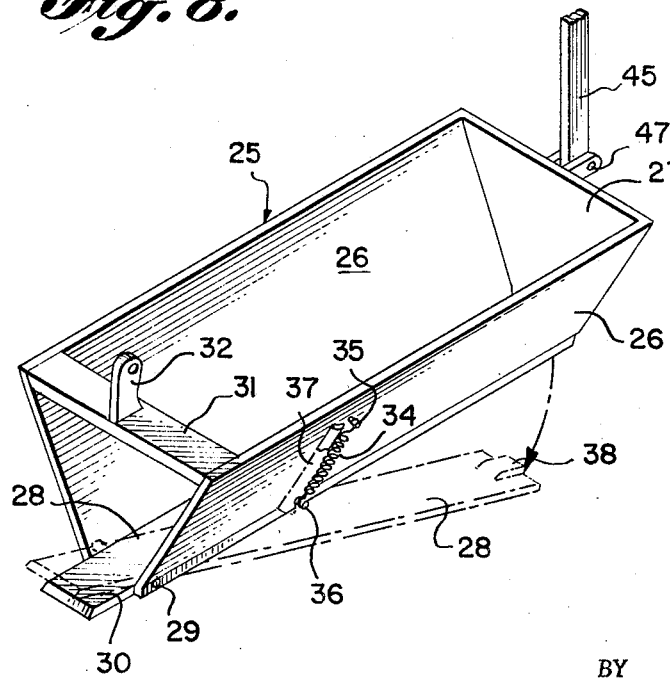
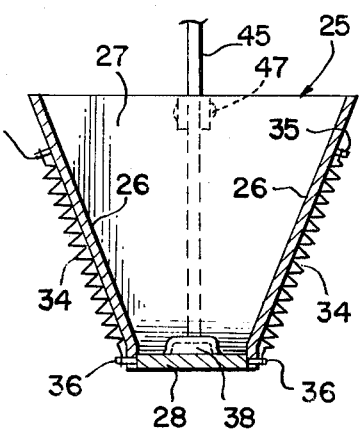
INVENTOR
JACK R. COX
BY
ATTORNEY

United States Patent Office 3,511,394
Patented May 12, 1970

3,511,394
DRAINAGE DITCH MACHINE
Jack R. Cox, P.O. Box 1104,
Myrtle Beach, S.C. 29577
Filed Sept. 29, 1967, Ser. No. 671,847
Int. Cl. E02f 5/02
U.S. Cl. 214—90                                          6 Claims

ABSTRACT OF THE DISCLOSURE

A machine for forming drainage ditches and the like and for clearing existing ditches of debris. A conventional farm tractor carries a scoop and draws a transverse conveyor by means of flexible chains. The chains enable the tractor to back up relative to the conveyor for dumping the scoop. The dumping is effected by a latch operator which coacts with an abutment on the conveyor. Soil and debris taken from the ditch is thus deposited on the conveyor which discharges the material in a substantially continuous operation beyond one side of the ditch.

BACKGROUND OF THE INVENTION

The invention arises as a result of a long-felt need for a practical and economical machine to enable the farmer to build and clear drainage ditches and the like, particularly the smaller branch ditches which rather frequently become clogged with debris. Conventional equipment is available for this operation, such as back hoe machines and attachments and drag line equipment, but such equipment is prohibitively expensive and requires considerable skill to operate and renders the task of clearing the ditches very time consuming and costly.

The invention herein provides a much less expensive machine for this purpose and one which requires practically no skill to operate, while building or clearing a ditch in a comparatively rapid, efficient and substantially continuous mode of operation.

SUMMARY OF THE INVENTION

The invention utilizes a farm tractor having a three point implement hitch and lift mechanism. The tractor hitch carries a specially designed scoop which clears the ditch while in a lowered condition. The tractor tows a laterally discharging conveyor through flexible connections at a distance behind the scoop and periodically, during the traversing of the ditch, the scoop is elevated to a sufficient height to discharge onto the conveyor and the tractor is backed up a slight amount to bring the scoop to a dumping position above the conveyor, at which time an activator device on the conveyor trips a release mechanism on the scoop causing the scoop to discharge its contents onto the conveyor, after which the scoop recloses automatically or is reset for further ditching work.

BRIEF DESCRIPTION OF THE DRAWING

FIG. 6 is an enlarged exploded perspective view of a conveyor wheel mounting;

FIG. 7 is a transverse vertical section taken on line 7—7 of FIG. 2;

FIG. 8 is a perspective view of a scoop employed to clear the ditch; and

FIG. 9 is a transverse vertical section taken on line 9—9 of FIG. 3.

DESCRIPTION OF THE PREFERRED EMBODIMENT

Figure 1:
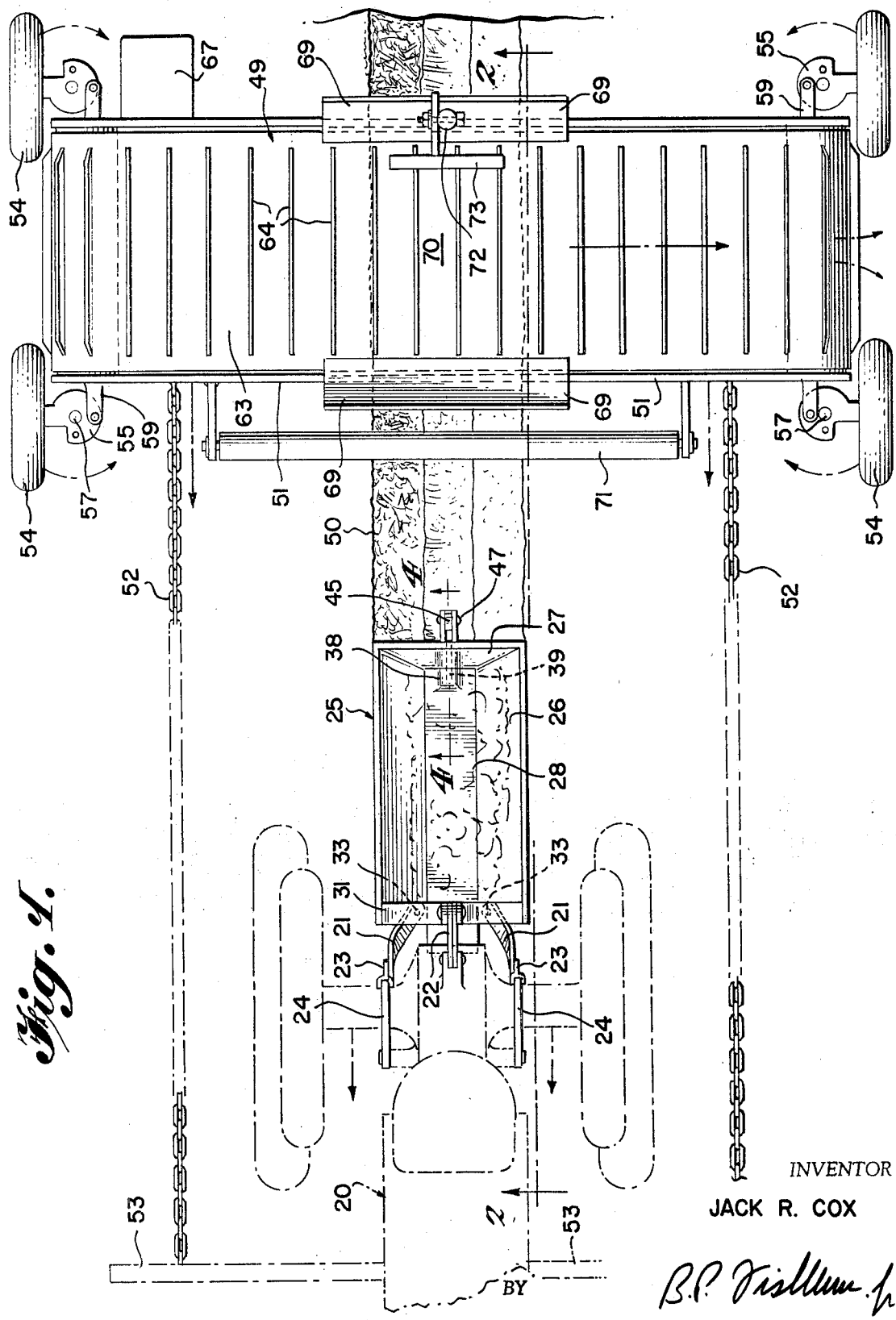
FIG. 1 is a plan view of a drainage ditch clearing machine embodying the invention.

Referring to the drawing wherein like numerals designate like parts, the numeral 20 designates a conventional farm tractor of any well-known type equipped with a conventional three point hitch structure including a lower pair of arms 21 and an upper arm or link 22 arranged between the lower arms 21. Lift links 23 connect the lower arms 21 with hydraulically operated lifter cranks 24 of the tractor. Three point hitches of this type are well known in the art and no further description of the hitch structure should be required for a proper understanding of the invention. Hitches of this character are employed for mounting various implements at the rear of a tractor so that the implements may be drawn by the tractor and raised and lowered and bodily carried above ground.

Figure 2:
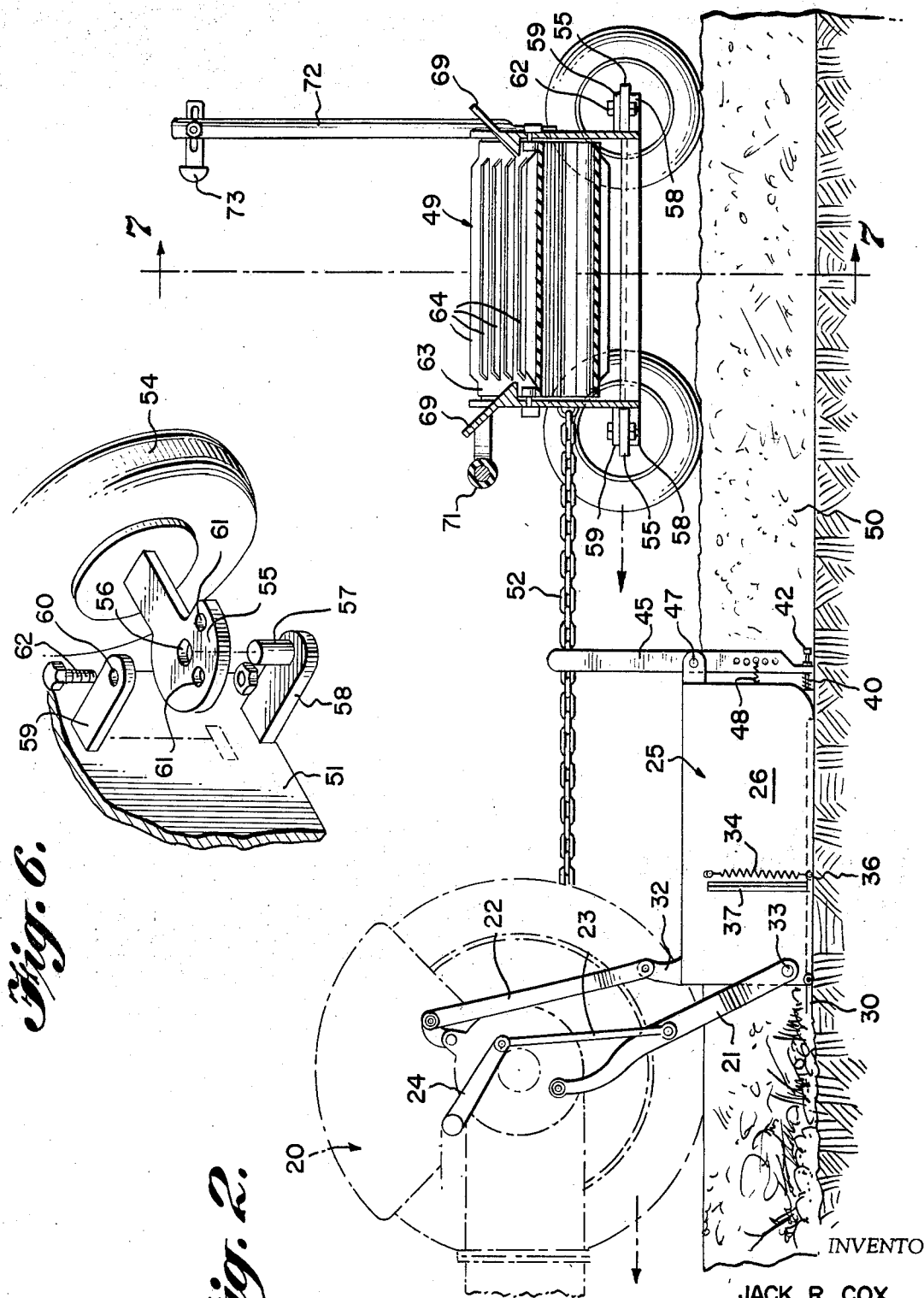
FIG. 2 is a longitudinal vertical section taken on line 2—2 of FIG. 1.

In the present invention, a specially constructed ditching scoop or bucket 25 is mounted upon and carried by the tractor three point hitch as shown in the drawings. The scoop 25 has sloping downwardly converging side walls 26, a vertical back wall 27 and a narrow bottom wall in the form of a blade or plate 28 hingedly secured to the body of the scoop for longitudinal vertical swinging movement on a transverse pivot element 29. The blade 28 has a somewhat forwardly projecting scraper extension 30 which extends forwardly of the scoop body. The top of the scoop 25 and its forward end are open as best shown in FIG. 8. At its top and forward end, the scoop is provided with a sturdy crossbar 31 having an upstanding apertured lug 32 at its center pivotally connected with the lower end of the top link 22 as shown in FIG. 2. The lower links 21 of the tractor hitch are pivotally connected as at 33 with the side walls 26 near the bottom and forward end of the scoop. In this manner, the scoop 25 is bodily carried by the three point hitch and may be raised and lowered by means of the cranks 24 between positions indicated in FIGS. 2 and 3, for example. The scoop 25 remains level at all elevations and this is a characteristic of the hitch structure.

The blade 28 is maintained normally in a horizontally closed or latched position so as to effectively close the bottom of the scoop by means of a pair of rather strong retractile springs 34 whose top ends are connected at 35 to scoop side walls and whose lower ends are connected with pins 36 carried by the opposite longitudinal edges of the blade or plate 28. As shown in the drawing, the springs 34 and associated elements are arranged somewhat forwardly of the longitudinal center of the scoop 25. If desired, the springs 34 may be protected by dirt deflectors or shields 37 arranged slightly forwardly thereof on the side walls 26.

Figure 4:
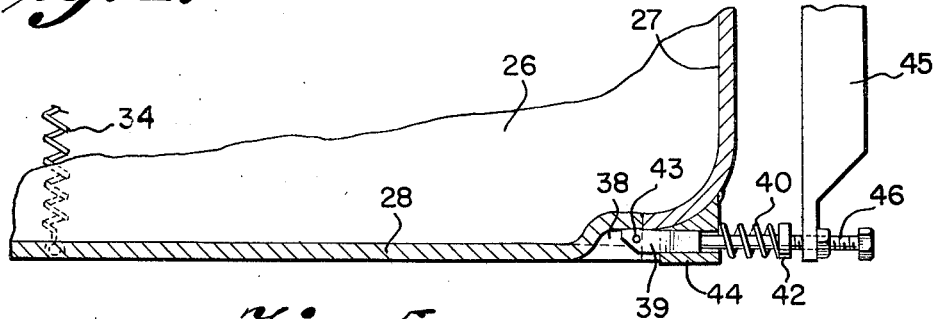
FIG. 4 is an enlarged vertical section taken on line 4—4 of FIG. 1.
Figure 5:
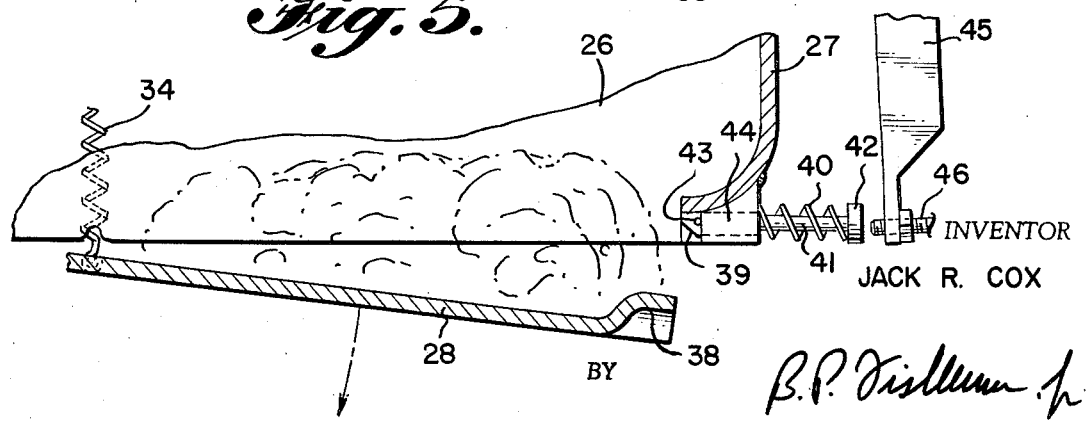
FIG. 5 is a similar section illustrating the release of a scoop latch device shown closed in FIG. 4.

The rear end of the blade 28 is formed to provide a latching socket 38 adapted to receive a latching bolt 39 urged to a non-latching position, FIG. 5, by a compressible spring 40 surrounding the bolt shank 41 bearing against against an enlarged head 42 on the rear of this shank. A small cross pin 43 on the forward portion of the bolt 39 limits the extent of retraction of the bolt by engagement with the bolt guiding lug 44, as shown in FIG. 5. As will be fully described, the bolt 39 is released for automatic shifting to the inactive position shown in FIG. 5 at the proper time. The bolt is normally held in the active or locking position of FIG. 4 against the force of spring 40 by means of an upright latch control arm 45 having at its lower end an adjustable element 46 which may contact the head 42 of the bolt. The arm 45 is pivoted between its ends as at 47 to the back wall of the scoop or bucket 25, and the top of the control arm extends for a substantial distance vertically above the bucket, FIG. 3. An additional spring means 48 serves to hold the control arm 45 in active contact through the element 46 with the head 42 of the bolt. As depicted in FIG. 5, the blade or plate 28 swings downwardly at its rear end when released by the bolt 39 under the influence of the weight of the dirt or debris upon it, and the springs 34 yield to permit this dumping action. The springs 34 are sufficiently strong to return the blade 28 automatically to the closed position when the contents of the scoop have been discharged, as will be further discussed.

Operating in conjunction with the tractor-carried scoop 25 is a trailing low elevation wheeled power driven conveyor 49 which extends laterally or at right angles to the ditch 50 which is being worked upon by the machine. As shown in FIG. 7, the conveyor spans the drainage ditch and extends for considerable distances on opposite sides thereof. The conveyor includes a rigid frame structure 51 connected near and inwardly of its ends with a pair of forwardly extending parallel chains 52 which are spaced outwardly of the rear wheels of the tractor and extend forwardly of the rear wheels and have their forward ends connected with rigid lateral arms 53 secured to opposite sides of the tractor, as shown in FIG. 1. The chains 52 are of such lengths that the conveyor 49 will trail the scoop 25 at a sufficient distance to allow full manipulation of the scoop by the tractor hitch without the possibility of interference. The trailing relation of the conveyor structure to the scoop, while the scoop is in an active position in the ditch, is clearly shown in FIGS. 1 and 2 and in this condition the conveyor 49 is bodily above the elevation of the scoop.

Figure 3:
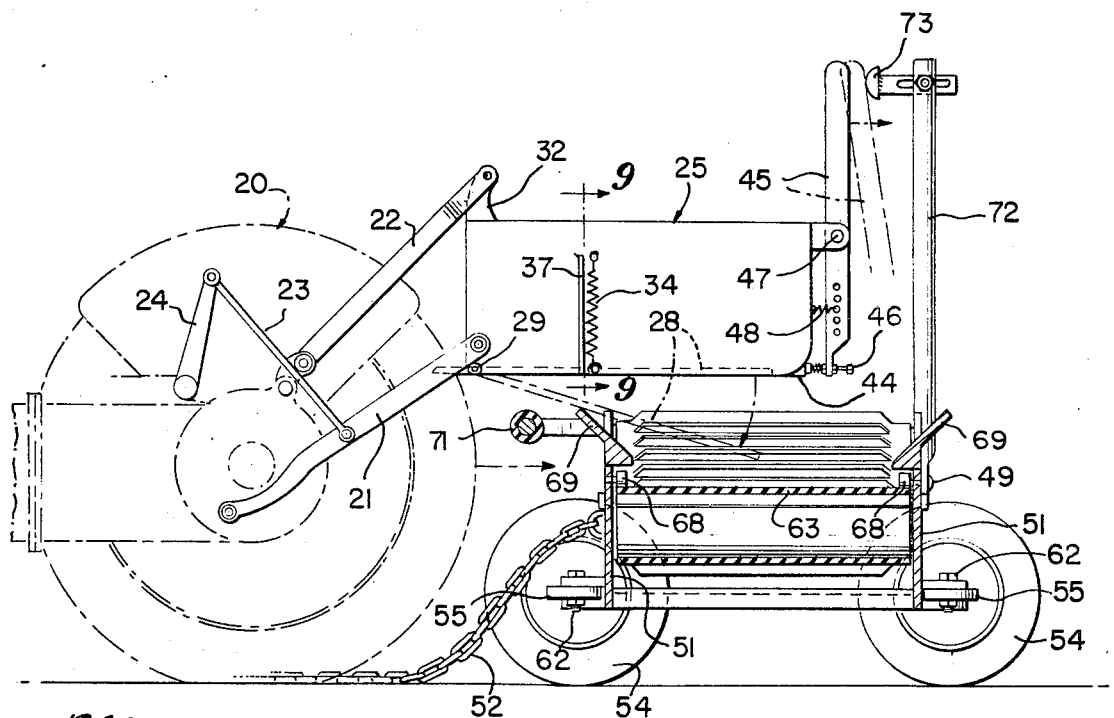
FIG. 3 is a side elevational view of the machine with parts in section in a discharging position with the tractor backed up toward the conveyor.

The conveyor 49 is supported for movement by castertype wheels 54 which may be adjusted to the positions shown in the drawing to enable the conveyor to travel lengthwise of the ditch. When desired, the wheels 54 are turnable to positions at right angles to the positions shown in FIG. 1 as when the conveyor is disconnected from the tractor and is to be moved longitudinally. To facilitate this, each wheel 54 is carried rotatably by a plate member 55 having an arcuate shape, FIG. 6, said plate member having a central pivot opening 56 to receive an upstanding kingpin 57 on lower lug 58 rigid with frame 51 An upper rigid lug 59 on the conveyor frame has an opening 60 for registry with either of two openings 61 formed in plate 55 outwardly of pivot opening 56 and spaced apart 90 degrees circumferentially. A bolt 62 engages through the opening 60 and one of the openings 61 to releasably secure the wheel 54 in one of two adjusted positions, longitudinally of the conveyor structure or perpendicular thereto and parallel to the ditch 50, as in FIG. 1. The plate member 55 engages between the lugs 58 and 59 in assembly as shown in FIGS. 3 and 2. If preferred, other forms of wheel mounting may be utilized and the construction in FIG. 6 is merely a preferred construction which is quite practical and sturdy.

The conveyor 49 further comprises an endless conveyor belt 63 preferably formed of rubber-like material and preferably equipped with lugs 64 to prevent back-sliding of the material. The belt 63 is trained over end rolls 65 and 66, the former of which is driven by a suitable motor shown diagrammatically at 67. The central area of the belt is depressed below the rollers 65 and 66 by means of suitable guide rolls 68 and this depressed region of the conveyor belt is bounded on opposite sides by shallow inclined hopper walls 69 which aid in guiding the dirt and debris onto the conveyor belt when discharged from the scoop 25. It is desirable that the receiving portion 70 of the conveyor belt be at a relatively low elevation to enable the scoop 25 and blade or plate 28 to properly discharge the debris onto the conveyor belt.

Means are provided on the conveyor structure to operate the latch control lever 45 of the scoop at the proper time when the scoop is elevated and backed up by the tractor to a discharge position over the conveyor belt, as shown in FIG. 3. When this occurs, the chains 52 become slackened as shown. A safety bumper 71 is preferably provided on the front side of the conveyor to engage the rear wheels of the tractor in any emergency situation to prevent damage to the parts. The mentioned means on the conveyor comprises a rigid upstanding post 72 secured to the rear side of frame 51 and projecting for a substantial height above the conveyor and equipped at its top end with an adjustable crosspiece or abutment 73. The abutment 73 is positioned to engage the top of control arm 45 when the tractor is backed up, FIG. 3, and to swing the arm 45 counterclockwise upon its pivot 47 and thus release the bolt head 42, as shown in FIG. 5, so that the spring 40 can retract the bolt 39 and unlatch the plate 28 for discharge of material from the scoop 25 onto the traveling conveyor belt. The material thus deposited on the belt from the ditch will travel to one end of the conveyor, as shown by the arrows in FIG. 7, and will discharge onto the ground in a kind of window spaced substantially from the ditch. When the scoop 25 has empited and the tractor 20 begins to move forwardly toward the conveyor towing position of FIGS. 1 and 2, the control lever 45 will return automatically under influence of spring 48 to the vertical position where element 46 will engage bolt head 42 and compress spring 40 and shift the bolt 39 to the active or locking position, FIG. 4. The springs 34 will return the plate or blade 28 to the closed position and the scoop 25 therefore will close itself automatically. The scoop is of course shaped to conform to the cross section of the ditch 50 and continually scrapes and forms and cleans out the ditch as the machine traverses it. The scraper extension 30 will cut through the debris at the bottom of the ditch and thus aid in the smooth passage of the machine along the ditch.

The mode of operation of the machine is simple and involves forward driving of the tractor with the scoop lowered into the ditch, FIG. 2, until the scoop is filled. When this occurs, the tractor is stopped and the scoop is elevated and the tractor is backed up sufficiently to move the scoop over the conveyor for discharge as in FIG. 3. After discharge, the tractor moves forwardly, the scoop automatically closes and is lowered into the ditch and the entire caravan of tractor, scoop and trailing conveyor moves forwardly. In this manner, the ditch is effectively cleared without the necessity for expensive back hoe equipment, drag lines and the like and without the need for skilled personnel. The apparatus can be separated after use and the farm tractor will be available for conventional usage with other implements. The advantages of the invention will now be apparent to those skilled in the art without the need for further description herein.

I claim:

1. A machine for clearing ditches and the like comprising a towing tractor to traverse a ditch longitudinally, an implement lift device on the rear of the tractor adapted to raise and lower an implement, a scoop carried by the implement lift and having a pivoted bottom wall portion and latch means to secure said bottom wall portion in a closed position, an operator for the latch means on the scoop, a trailing transverse conveyor constituting a separate vehicle behind the tractor and having a moving transverse conveyor element to receive material from the scoop and deposit it beyond one side of the ditch, flexible connecting means between the tractor and said trailing conveyor allowing the tractor and scoop to back up relative to the conveyor without moving the conveyor, and a member on the trailing conveyor engageable with said latch operator when the tractor is backed up to then release the latch means while the scoop is held above the conveyor element.

2. A machine for clearing ditches comprising a towing vehicle to traverse the ditch longitudinally, a scoop device carried by the towing vehicle to collect and remove material from the ditch, means to raise and lower the scoop device, a trailing conveyor behind said vehicle and scoop device adapted to discharge material beyond one side of the ditch, a flexible towing connection between the conveyor and vehicle allowing the vehicle to back up relative to the conveyor without moving the conveyor, an abutment member on the conveyor, a coacting pivoted control arm on the scoop device engageable with the abutment member upon backing up of the towing vehicle, a pivoted plate on the bottom of the scoop forming a bottom closure therefor, latch means for the pivoted plate released by movement of the control arm when the latter is engaged by said abutment member, resilient means connected with the pivoted plate tending to close the same, and an additional resilient means connected with the control arm tending to hold the same in engagement with the latch means.

3. The structure of claim 2, and another resilient means on said latch means urging the latter to a non-latching position relative to the pivoted plate and tending to resist the control arm.

4. The structure of claim 2, and said scoop device comprising a scoop body having its top and forward end open and having downwardly converging side walls and a rear wall, said pivoted plate disposed between the side walls at the bottom of the scoop and being vertically swingable and having its rear end dropped downwardly for discharging material, and said latch means engageable with said rear end.

5. The structure of claim 2, and said trailing conveyor including a transverse endless conveyor belt, said belt having a central depressed region, and a shallow hopper bounding the depressed region of the belt to facilitate entry of material from the scoop device onto the belt.

6. The structure of claim 2, and said flexible towing connection comprises a pair of chains arranged outwardly of the sides of the towing vehicle and connected at their rear ends with the conveyor near the ends of the conveyor, and a pair of laterally extending arms on the towing vehicle forwardly of the rear wheels thereof and connected with the forward ends of the chains.

References Cited

UNITED STATES PATENTS

| 207,229 | 8/1878 | Wells | 198—54 |
|---|---|---|---|
| 987,660 | 3/1911 | Wood | 37—103 |
| 1,085,035 | 1/1914 | Greimann | 214—90 |
| 1,164,309 | 12/1915 | Nilson | 280—407 |
| 1,536,390 | 5/1925 | Downie. | |
| 2,305,044 | 12/1942 | Toews | 198—198 |
| 2,395,716 | 2/1946 | Biedess | 214—41 XR |
| 2,598,339 | 5/1952 | Askue | 37—97 XR |
| 2,983,362 | 5/1961 | Crist | 198—57 |
| 3,139,288 | 6/1964 | Peterson | 280—34 |
| 3,319,367 | 5/1967 | Lewis | 37—118 |

FOREIGN PATENTS 170,839  3/1960  Sweden.

ROBERT E. PULFREY, Primary Examiner

C. D. CROWDER, Assistant Examiner

U.S. Cl. X.R.

214—146; 37—103, 118; 172—439; 280—407, 480, 34; 138—57, 198